(12) United States Patent
Bizzotto

(10) Patent No.: US 8,857,059 B2
(45) Date of Patent: Oct. 14, 2014

(54) MANUFACTURED ARTICLE AND A METHOD OF OBTAINING THEREOF

(71) Applicant: Giovanni Bizzotto, Cassola-Vicenza (IT)

(72) Inventor: Giovanni Bizzotto, Cassola-Vicenza (IT)

(73) Assignee: Dibi S.p.A. (IT)

( * ) Notice: Subject to any disclaimer, the term of this patent is extended or adjusted under 35 U.S.C. 154(b) by 0 days.

(21) Appl. No.: 13/778,510

(22) Filed: Feb. 27, 2013

(65) Prior Publication Data

US 2013/0236679 A1     Sep. 12, 2013

(30) Foreign Application Priority Data

Mar. 6, 2012  (IT) ................. VR2012A0037
Sep. 7, 2012  (IT) ................. VR2012A0181

(51) Int. Cl.
| | |
|---|---|
| A44C 17/04 | (2006.01) |
| B32B 3/14 | (2006.01) |
| A44C 17/02 | (2006.01) |
| A44C 25/00 | (2006.01) |
| A44C 27/00 | (2006.01) |
| B23P 11/00 | (2006.01) |
| A44C 13/00 | (2006.01) |

(52) U.S. Cl.
CPC .............. *B32B 3/14* (2013.01); *A44C 17/0225* (2013.01); *A44C 17/046* (2013.01); *A44C 25/001* (2013.01); *A44C 17/0208* (2013.01); *A44C 25/00* (2013.01); *A44C 17/0258* (2013.01); *A44C 27/00* (2013.01); *B23P 11/00* (2013.01); *A44C 13/00* (2013.01)

USPC .............. 29/896.41; 29/10; 29/433; 29/241; 29/464; 63/38

(58) Field of Classification Search
CPC ......... A44C 17/04; A44C 27/00; A44C 17/02
USPC ......... 29/9, 433, 241, 464, 896.4, 896.41, 10; 63/28, 31, 26, 38, 39, 23
See application file for complete search history.

(56) References Cited

U.S. PATENT DOCUMENTS 921,759 A * 5/1909 Walker ............................. 63/28
964,625 A    7/1910 Doran
(Continued)

FOREIGN PATENT DOCUMENTS

| DE | 100 13 562 A1 | 9/2001 |
|---|---|---|
| EP | 0 489 250 | 6/1992 |

(Continued)

OTHER PUBLICATIONS

Search Report dated Jun. 6, 2013 issued in corresponding European Patent Application No. EP 13 15 7831.

(Continued)

*Primary Examiner* — David Bryant
*Assistant Examiner* — Jason L Vaughan
(74) *Attorney, Agent, or Firm* — Otrolenk Faber LLP

(57) ABSTRACT

The present invention relates to a manufactured article comprising a support component (2) delimiting therein at least one receiving seat (3), at least one inserted component (4) designed to be seated in a respective receiving seat (3) in the support component (2), and binding means for binding the inserted component (4) to a respective receiving seat (3). The at least one inserted component (4) is mounted for rotation in the at least one receiving seat (3).

6 Claims, 6 Drawing Sheets

(56) References Cited

U.S. PATENT DOCUMENTS

| | | | | |
|---|---|---|---|---|
| 1,728,266 | A | * | 9/1929 | Fassnacht .......................... 63/26 |
| 1,997,500 | A | * | 4/1935 | Swarovski .................... 264/274 |
| RE20,193 | E | * | 12/1936 | Swarovski ........................ 63/33 |
| 2,102,746 | A | * | 12/1937 | Reilly .............................. 383/34 |
| 2,163,814 | A | * | 6/1939 | Swarovski .................... 264/274 |
| 2,263,340 | A | * | 11/1941 | Kraemer ........................... 59/80 |
| 2,573,087 | A | * | 10/1951 | Youngblood et al. ........... 29/241 |
| 2,610,385 | A | * | 9/1952 | Manne ............................... 29/10 |
| 2,852,923 | A | | 9/1958 | Gamelsky |
| 3,106,010 | A | * | 10/1963 | Morrell .............................. 29/11 |
| 3,196,064 | A | * | 7/1965 | Tell ............................ 156/272.4 |
| 3,931,719 | A | * | 1/1976 | Schwab ............................ 63/28 |
| 4,517,817 | A | * | 5/1985 | Levin ................................ 63/26 |
| 4,731,913 | A | * | 3/1988 | Plantureux et al. ................ 29/10 |
| 5,494,734 | A | * | 2/1996 | Widders ............................ 442/2 |
| 6,196,025 | B1 | | 3/2001 | Moshkovitz |
| 8,584,329 | B2 | * | 11/2013 | Dhakka ............................. 29/10 |
| 2003/0172673 | A1 | | 9/2003 | Kimura .......................... 63/29.1 |
| 2005/0152149 | A1 | | 7/2005 | Bayer ........................... 362/404 |

FOREIGN PATENT DOCUMENTS

| | | |
|---|---|---|
| EP | 1 707 509 A1 | 10/2006 |
| EP | 1 964 487 | 9/2008 |
| FR | 959 982 | 4/1950 |
| FR | 2 680 954 | 3/1993 |
| WO | WO 92/00686 | 1/1992 |
| WO | WO 93/09691 | 5/1993 |

OTHER PUBLICATIONS

European Search Report dated Oct. 30, 2012 issued in connection with corresponding Italian patent application No. IT VR2012A000037.

* cited by examiner

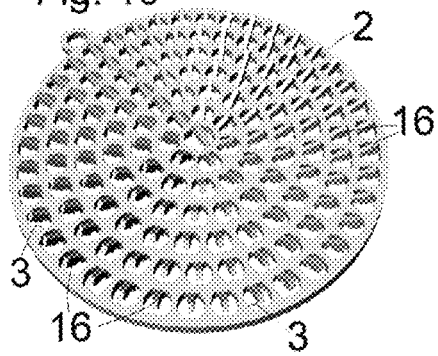
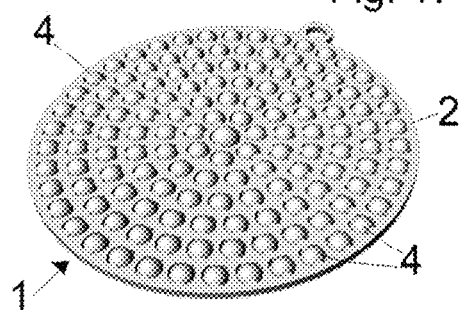
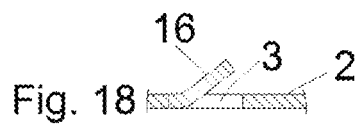
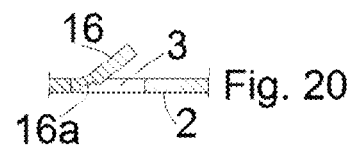
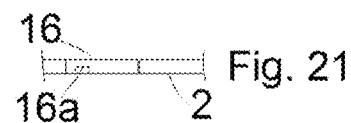
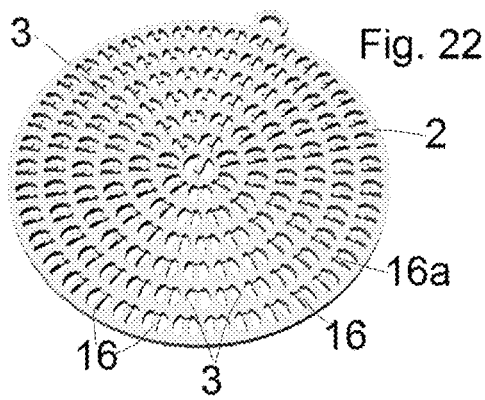
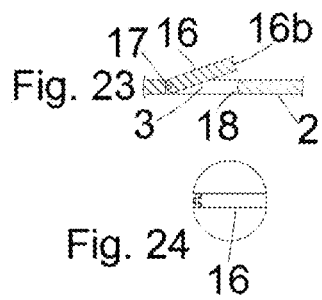
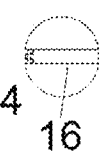
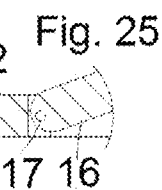

MANUFACTURED ARTICLE AND A METHOD OF OBTAINING THEREOF

FIELD OF INVENTION

The present invention relates to a manufactured article and a method of obtaining the same.

The term "manufactured article" in the present description and in the claims is to meant to indicate one of a plurality of objects such as a jewel, a necklace, a bracelet, earrings, a ring, a pendant, a clock, or a knick-knack, a toy or an outfit and the like.

BACKGROUND OF INVENTION

Jewels are well known which are entirely or partly constituted by a plurality of small pearls held together by a cable on which the pearls are strung.

Thus, the European patent application EP-0 489 250 teaches a bracelet comprising a curved tubular main body and a cable extending outside the main body and is connected at its ends to the end sections of the main body. A plurality of small spheres are strung onto the cable. The U.S. Pat. No. 6,196,025 teaches a jewel having a main body delimiting therein a seat for receiving a diamond, the diamond being seated in the seat, although being movable therein.

EP-1 964 487, FR-2 680 954, U.S. Pat. No. 2,852,923 and U.S. Pat. No. 964,625 teach respective jewels provided with a plurality of diamonds or stones fixed on a base component.

SUMMARY OF THE INVENTION

The main object of the present invention is to provide a new method of obtaining a manufactured article, which is simple and rapid to carry out and thus very advantageous from an economic point of view.

Another object of the present invention is to provide a manufactured article which is suitable for obtaining new aesthetic and decorative effects for being usable in a number of applications.

According to a first aspect of the present invention, a manufactured article is provided, which comprises at least one support component delimiting therein at least one receiving seat, at least one inserted component designed to be seated in a respective receiving seat in the support component, and binding means for binding the at least one inserted component to a respective receiving seat, the at least one receiving seat having at least one recess, or inwardly extending lug portion, and the binding means having a protruding portion designed to engage with a respective recess, or a notch designed to engage with a respective inwardly extending lug, respectively, and the at least one inserted component being mounted for rotation in the at least one receiving seat.

Preferably, the inwardly extending lug or the protruding portion has a longitudinal axis, and the at least one inserted component is mounted for rotation about the longitudinal axis, whereby portions of the at least one inserted component can be displaced between a position outside or in sight from the at least one receiving seat and a position at least partly housed in the at least one receiving seat.

More preferably, the at least one inserted component is anchored to the support component at at least two inwardly extending lugs or protruding portions, and is mounted for rotation about an axis passing through the at least two inwardly extending lugs or protruding portions.

Advantageously, the at least one receiving seat is a through seat.

More advantageously, the at least one inserted component, when seated in the at least one through receiving seat, is engageable or reachable from both sides or openings of the at least one receiving seat.

According to another aspect of the present invention, a method of obtaining a manufactured article is provided, comprising the following steps of:
  providing the components of a manufactured article according to the present invention; and
  constraining the inserted component to the support component.

Preferably, before the step of constraining the inserted component to the support component the following steps are carried out:
  providing a base or mask component delimiting one or a plurality of slots having distribution and size substantially corresponding to the at least one receiving seat delimited by the support component;
  locating the inserted component in a respective slot of the base component;
  approaching the support component and the base component in such a way as to bring them in mutual abutment, and insert the at least one inserted component into the at least one respective receiving seat in the support component.

BRIEF DESCRIPTION OF THE DRAWINGS

Further aspects and advantages of the present invention will be clearer from the following detailed description of specific embodiments thereof, such description being made with reference to the accompanying drawings, in which:

FIG. 16 is a plan view of another support component of a pendant manufactured article according to the present invention, with lugs in a raised position or trim;

FIG. 17 is a plan view of the support component of FIG. 16, in which a plurality of inserted components have been located and fixed in position;

FIGS. 18 and 19 are cross section views illustrating a detail of the support component with a lug in raised and lowered position, respectively;

FIGS. 20 and 21 are cross section views illustrating a detail of a support component in accordance with another embodiment of the present invention, with a lug in raised and lowered position, respectively;

FIG. 22 is a bottom view of the support component according to the embodiment of FIGS. 20 and 21;

FIGS. 23 and 24 are cross section views showing a detail of a support component of a manufactured article in accordance with another embodiment of the present invention; and FIG. 25 is a view on an enlarged scale of a particular of FIG. 23.

In the set of drawings equivalent or similar parts or components are marked with the same reference numbers.

DETAILED DESCRIPTION OF THE PREFERRED EMBODIMENTS

Figure 1:
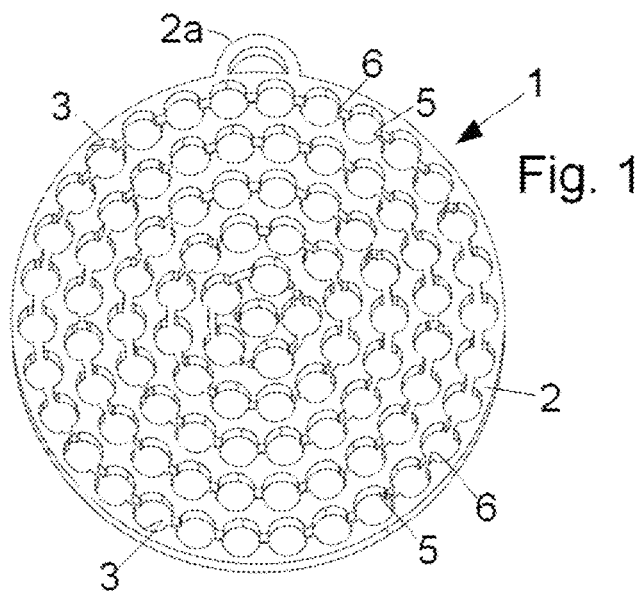
FIG. 1 is a plan view of a main support body of a pendant manufactured article according to the present invention, in which a number of through receiving seats have been formed ideally distributed along concentric circumferences.

With reference first to FIGS. 1 to 4, a manufactured article, such as a jewel comprising a pendant, in accordance with the present invention is shown, which comprises a support body or component 2, e.g. obtained from a substantially flat metallic plate (typically made of steel, precious or not precious metal and their alloys). In the plate support body 2 one or a plurality of receiving seats or cavities 3 have been formed, which are circular in the shown embodiment, for receiving or seating a respective inserted component 4 of any suitable type, such as a pearl. In this embodiment, the receiving seats 3 are through seats, although they could also be not-through or blind seats.

If one or more through receiving seats 3 are provided, their respective inserted component 4, when housed in the seat, is preferably engageable or reachable from both sides or openings of the receiving seat 3, in such a way that the inserted components are mountable and extractable in/from their respective receiving seats from both sides thereof. In this case, the inserted component/s, when it/they is/are housed or seated in the receiving seat/s, is/are preferably visible from both sides of the seats, and thus from two respective sides of the manufactured article.

Each receiving cavity or seat 3 is formed with two substantially opposite recesses 5, 6, which, in the present embodiment, communicate in the most cases with a recess of an adjacent receiving seat, such that series of pairs of receiving cavities or seats 3 uninterruptedly connected to one another by means of narrower through or non-through recesses are formed; narrower recesses are obtained from the union of a pair of adjacent recesses 5, 6. Combinations are provided, in which the receiving cavities or seats 3 are through cavities, whereas the recesses 5, 6 are non-through or through cavities, or the receiving cavities or seats 3 are non-through with through recesses 5, 6.

The inserted component 4 can have various configurations, e.g. a spherical, oval, cylindrical, cubic, parallelepiped, prismatic, or the like shape, and can be made of any suitable material, such as a metallic material, e.g. a precious metal and its alloy, such as gold, silver, brass, bronze, a non-precious material, such as steel, Zn+Al+Mg alloy, a precious stone, a hard stone, a pearl, either cultivated or natural, a plastic material and many other. The inserted component 4 can also include a surface decoration, such as diamond, satin, galvanized, painted, glossy, matt, multicolor, and the like surface.

The receiving seats or cavities 3 are preferably shaped substantially as the respective inserted component 4 to be seated therein. More particularly, the manufactured article 1 can include a plurality of receiving seats or cavities 3 having a circular contour, each comprising diametrically opposed recesses 5, 6.

Between support body 2 and inserted component 4 binding means for binding the inserted component 4 to a respective receiving seat 3 are provided, which include a protruding portion protruding from the inserted component 4 or from an engaging element 7 connected thereto, and designed to engage with a respective recess portion 5, 6, or a recessed portion formed in the inserted component 4 for engaging with a respective inwardly extending lug (not shown in the drawings) in the receiving seat 3.

More particularly, in a manufactured article according to the present invention, one or more inserted components 4 are mounted for rotation in the receiving seat 3, e.g. about an inwardly extending lug portion of the receiving seat 3 and/or about a protruding portion of the binding means. Preferably, the inwardly extending lug or the protruding portion has a longitudinal axis, and the inserted component is mounted for rotation about the longitudinal axis. Due to such a provision, portions of the inserted component 4 can be displaced between a position outside or in sight from its respective receiving seat 3 and a position at least partly housed in the receiving seat 3.

Preferably, the inserted component 4 is anchored to the support component 2 at at least two inwardly extending lugs or protruding portions and is mounted for rotation about an axis passing through the two inwardly extending lugs or protruding portions.

Preferably, the engaging element 7 is designed to engage, in use, with the inserted component 4 and to extend therefrom for being fixed in the two opposite recess portions 5, 6. The engaging element 7 can be of any suitable type. In particular, it could be made of a wire or a cable or strap, on which the inserted component 4 is inserted, and extend beyond the encumbrance of the inserted component 4 for reaching a recess 5, 6 or both the recesses provided one opposite to the other in the receiving seat 3 for the inserted component 4, where the engaging element 7 is fixed in any suitable way, e.g. glued, welded, braze-welded, screwed or the like.

The inserted components are mounted for rotation or in any way limitedly movable on the support component or on the strap or cable 7. Alternatively, the inserted components can be fixed or anchored to the strap or cable 7, while the strap or cable 7 can be mounted for rotation on the support component 2.

Figure 2:
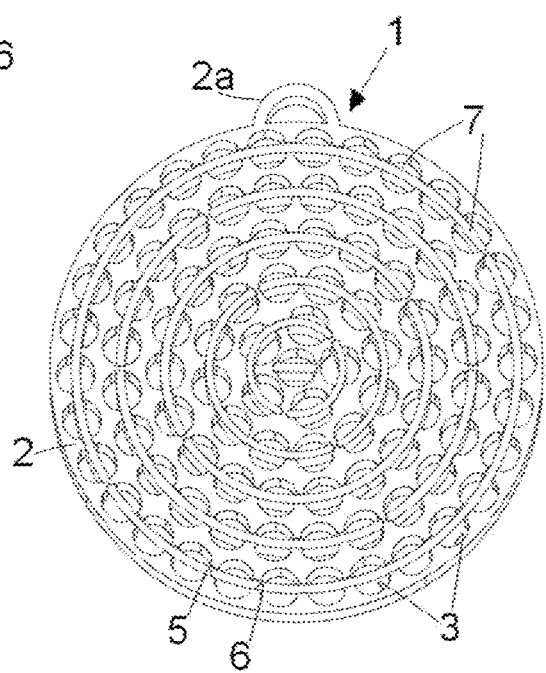
FIG. 2 is a top view of the main body of FIG. 1, in which a plurality of sections of a strip or tape have been located and fixed in position.
Figure 3:
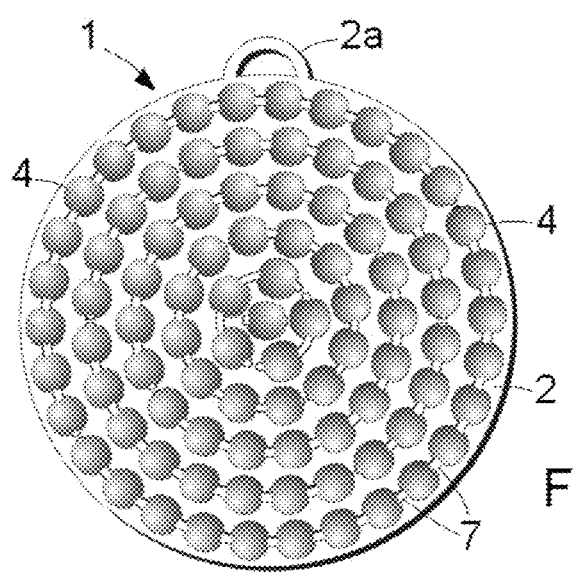
FIG. 3 is a top view of the main body of FIG. 1 showing a plurality of small pearl elements strung on strip sections such as those of FIG. 2 and each loosely housed in a respective receiving seat.
Figure 4:
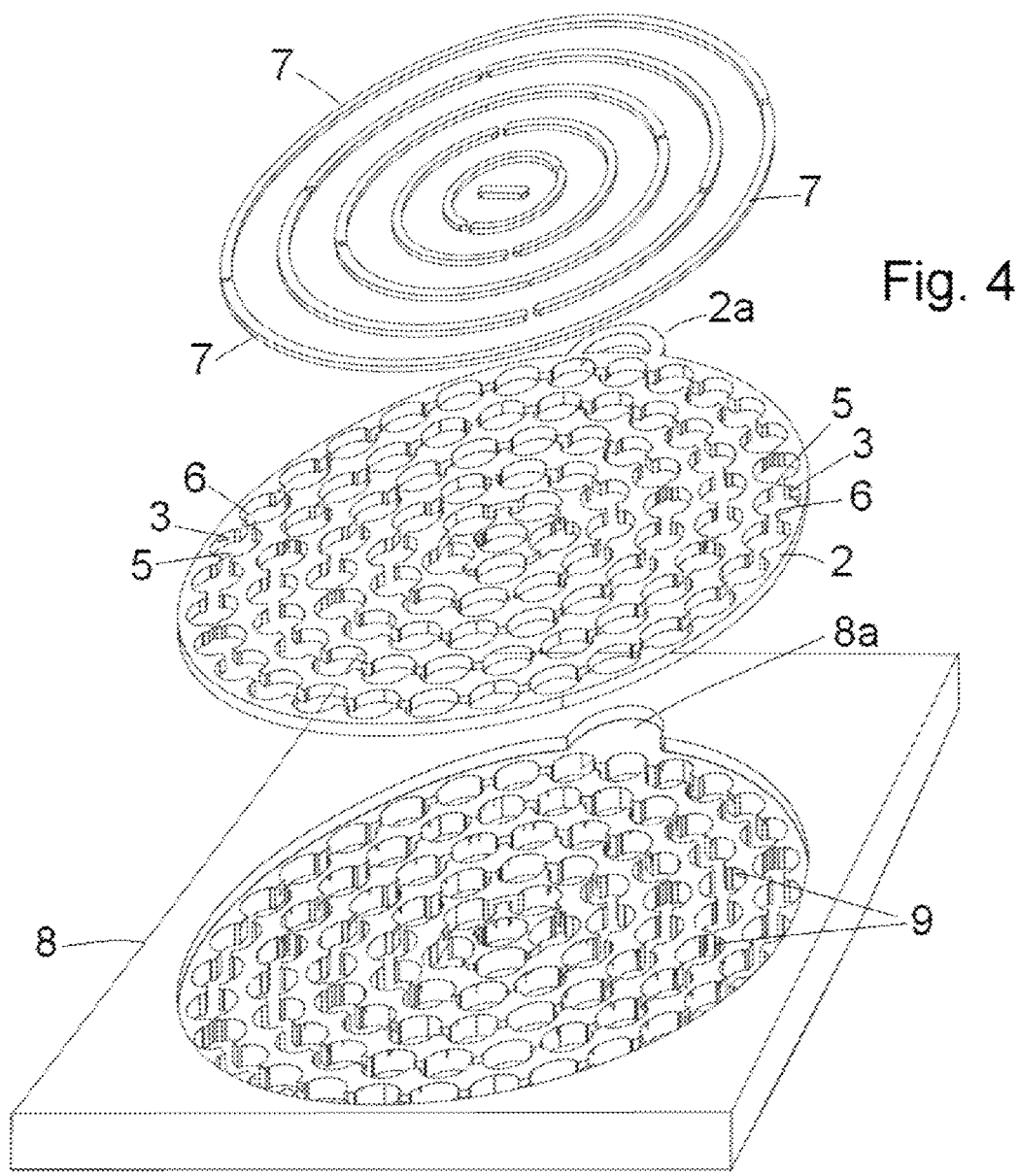
FIG. 4 is a view showing a step of the method according to the present invention.

With particular reference to the embodiment shown in FIGS. 1 to 3, the support component 2 comprises a small plate having a substantially circular contour, and the receiving seats or cavities 3 are substantially aligned along a series of concentric circumferences.

The inserted components 4 can include a plurality of bead or pearl elements mounted or inserted on engagement elements 7 comprising metallic straps or cables or the like. Each strap 7 has a width smaller than the connecting recesses 5, 6, which in this embodiment all have the same width and length. When the inserted components 4 have been arranged in their respective receiving seats 3, the strap portions 7 between two adjacent beads, will be located in the intercommunicating recesses 5, 6, where the strap portions 7 are fixed in any suitable way, e.g. glued, welded or screwed by means of screws or nails or they can snap fitted. According to a variation, in fact, the inserted components 4 have notches or grooves designed to snap engage with respective portions protruding inwardly in the receiving seats 3. Alternatively, the inserted components 4 have lugs designed to engage, e.g. snap engage, with respective recesses formed in the support component 2.

Advantageously, the support component 2 has an eyelet 2a for the insertion, for example, in a necklace, bracelet or the like.

In order to assemble a manufactured article 1 according to the present invention, advantageously a base or mask component 8 is used, delimiting one or a plurality of slots 9 having shape, distribution and size substantially corresponding to those of the receiving seats 3 formed in, or delimited by, the support component 2.

First of all, the inserted components 4 are placed in respective slots 9 of the mask 8; possibly the inserted components 4 are initially strung onto a cable or strap 7. The support component 2 and the base component 8 are approached to each other in such a way as to bring them in reciprocal abutment, and then the inserted components 4 are inserted into a respective receiving seat 3 of the support component 2. Subsequently, the inserted component/s 4 is/are anchored to the support component 2, for example the exposed portions of the cables or straps 7 are anchored, e.g. welded, snap fitted or anchored by means of a laser, a glue or in any other suitable way to the support component 2 at the recesses 5, 6.

At that point, the manufactured article is finished and can be removed from the base component 8.

Of course, the assembling steps can be carried out according to other methods, e.g. manually or automatically.

Preferably, the base component 8 has a bas-relief surface for abutment with the support component 2. The base component 8 can be provided with protruding or recessing parts 8a shaped in such a way as to shape engage with respective recessing or protruding portions of the support component 2, e.g. the eyelet 2a of the support component 2, thereby ensuring correct positioning of the support component 2 on the base component 8 and more particularly the alignment of the seats 3 and slots 9.

The support component 2 can be worked by means of a computerized numeric control milling machine or machine for obtaining a diamond-like effect and be obtained from a metallic plate. The plate can have glossy surfaces and be subsequently superficially glazed and/or worked by means of a method for obtaining a diamond-like effect, or milling, glazing methods and the like.

The support component 2 can also be obtained by microfusion or by means of a molding or shearing method or by means of electro-forming or other suitable methods.

Figure 5:
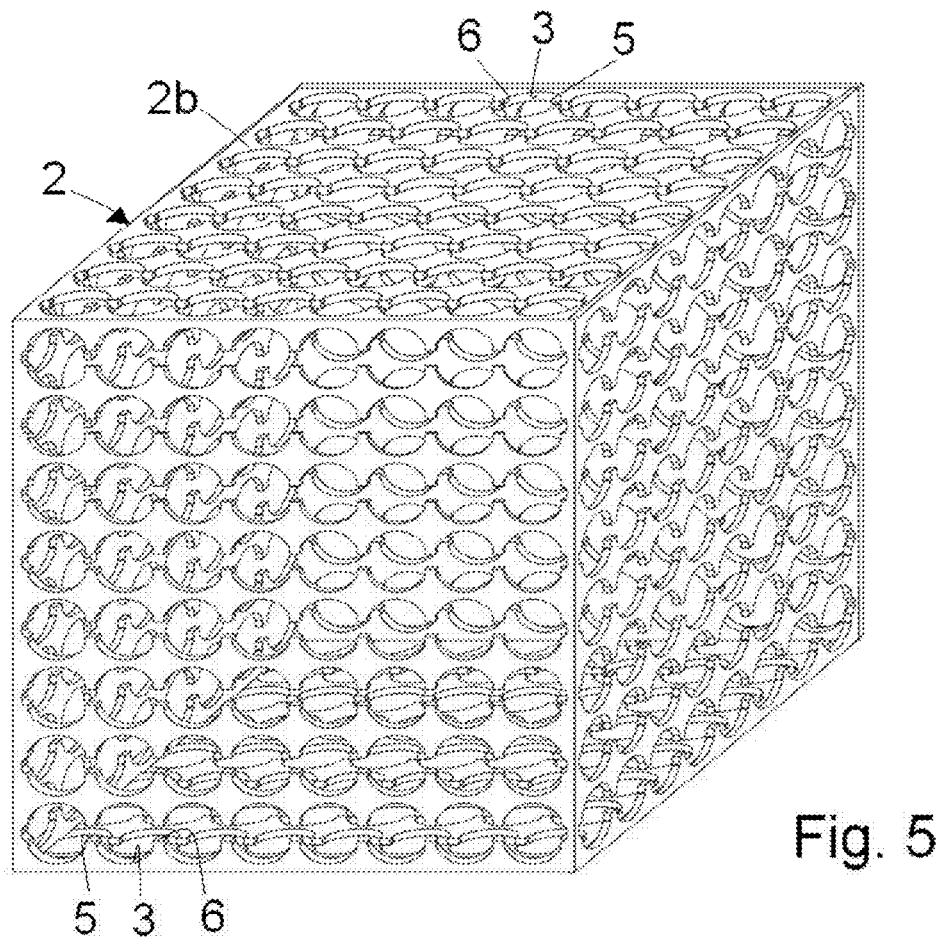
FIG. 5 is an isometric view of a cubic object having walls formed by a manufactured article according to the present invention.

In FIG. 5, a substantially parallelepiped-shaped support component 2 has been shown, which has substantially plane surfaces 2b fixed one to the other along the whole or a length of their edge.

Figure 6:
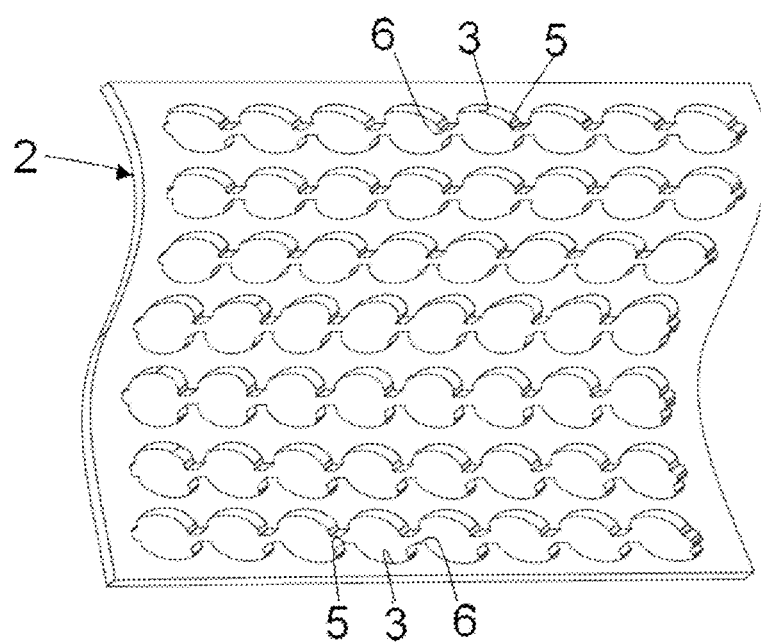
FIG. 6 shows another embodiment of a main support body.

According to a variant (FIG. 6), the support component 2 comprises a substantially flat but undulated body.

Figure 7:
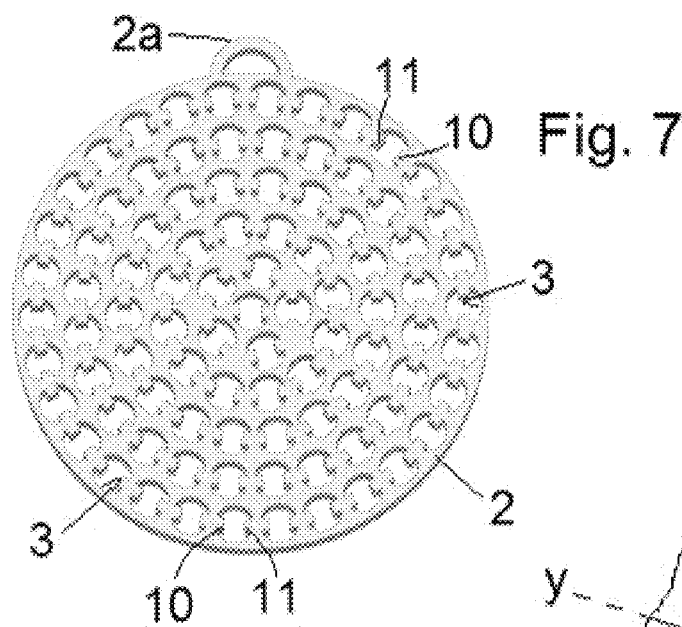
FIG. 7 is plan view of a main support body for a manufactured article according to another embodiment in accordance with the present invention.
Figure 8:
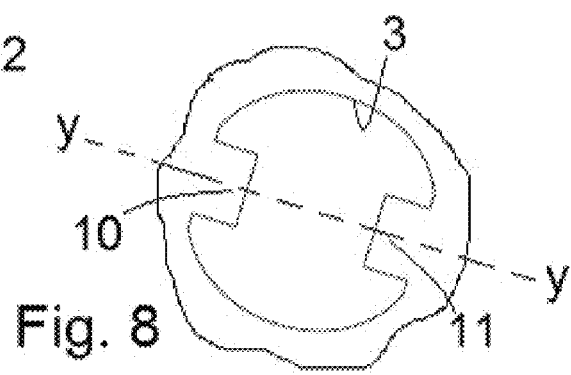
FIG. 8 is an enlarged view of a detail of FIG. 7.
Figure 9:
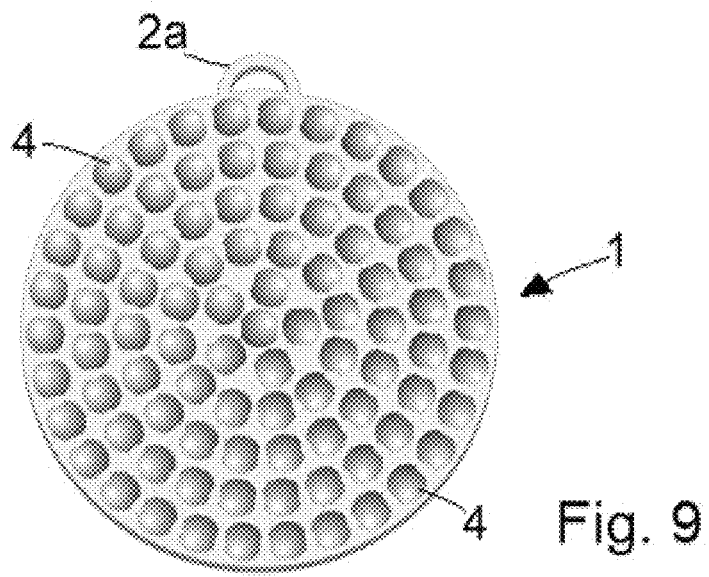
FIG. 9 is a plan view of a manufactured article obtained from the main body of FIG. 7.

Referring now to FIGS. 7, 8 and 9, a manufactured article has been shown, in which the binding means of the inserted component 4 to its respective receiving seat 3 includes one or more (two in the shown embodiment) inwardly extending lugs 10, 11 protruding in the receiving seats 3, which is/are designed to engage with a respective recess provided in the inserted component 4. The inserted component 4 is mounted for rotation in the seat 3, e.g. about the inwardly extending lugs 10, 11, preferably, about the longitudinal axis y-y of the lugs 10, 11, more preferably about the axis y-y passing through the two inwardly extending lugs 10, 11.

In order to lock the inserted component/s 4 to the support component 2, the inserted component/s 4 can be located in the respective seat/s and then the support component at the seats can be punched or deformed in any other way, thereby forming inwardly extending lugs and inserting them into respective recesses or recess portions of the inserted component/s 4.

The inserted component 4 can be snap fitted into the support component, e.g. by means of snap-fitting the lugs 10, 11 into respective recess portions of the inserted component/s 4.

Alternatively, each inserted component 4 can be inserted into a respective seat 3 and then deformed, thereby causing it to engage with the lug/s 10, 11. In order to obtain such engagement, the inserted component 4 can be made e.g. of a deformable material, even slightly resilient, e.g. a synthetic plastic material, and after the inserted component has been inserted into its respective seat 3, it is further pressed into, thereby obtaining a stable engagement between inserted component/s 4 and lug/s 10, 11. In such case, the lug/s can, for example, pierce or stably engage the inserted component, when such component has been deformed.

Figure 10:
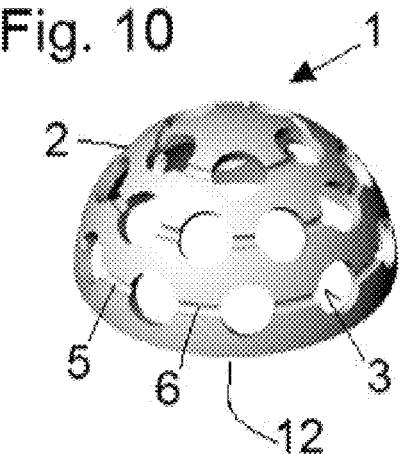
FIGS. 10 and 11 are views similar to FIGS. 1 and 3, respectively, but showing another embodiment of manufactured article according to the present invention.
Figure 11:
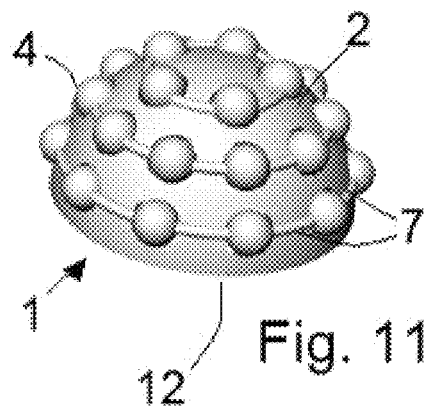

FIGS. 10 and 11 instead show a manufactured article according to the present invention, in which the support component 2 is substantially cap-shaped or shaped with another solid geometry shape, thus delimiting an inner space or chamber 12. As it will be understood, the inserted component/s 4 can be inserted in the seat/s 3 delimited by the support component 2 from outside of the support component or from inside thereof, i.e. from the chamber 12. Each inserted component 4 can be fixed in position in the respective seat 3 by any suitable method, as those above-mentioned.

Figure 12:
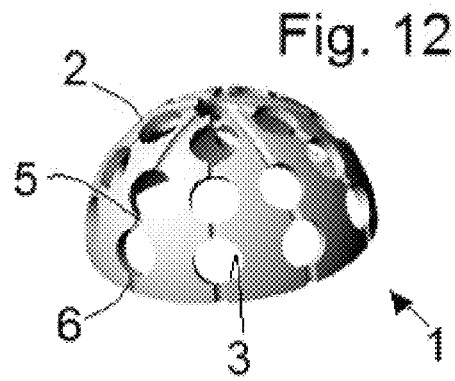
FIGS. 12 and 13 are view similar to FIGS. 1 and 3, respectively, but showing another embodiment of manufactured article according to the present invention.
Figure 13:
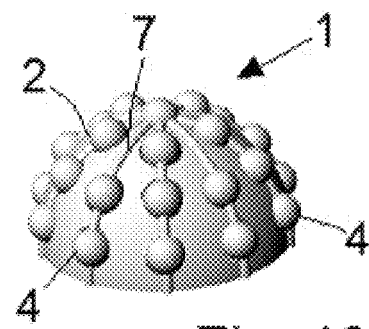

With reference to FIGS. 12 and 13, a manufactured article similar to that shown on FIGS. 12 and 13 is shown, but the cable sections 7 extend from the vertex or top of the cup support component 2 towards the base thereof, whereas in the embodiment shown in FIGS. 10 and 11, the cable sections 7 preferably extend along circumferential directions of the cup support component 2.

Figure 14:
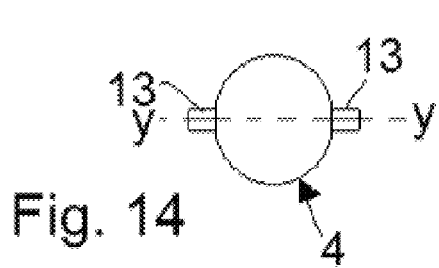
FIGS. 14 and 15 are a side and cross section view, respectively, of a respective inserted component for a manufactured article according to the present invention.

FIG. 14 shows an inserted component 4, e.g. having a hollow or full spherical body provided with one or more lugs, for example a pair of lugs 13, preferably extending one diametrically opposite to the other with respect to the body of the inserted component 4. One or more inserted components are mounted for rotation on the lugs or protruding portions 13. Preferably, the protruding portions 13 has longitudinal axis y-y about which a respective inserted component 4 is mounted, in such a way as portions of the inserted component 4 can be displaced between a position outside or in sight from the respective receiving seat 3 and a position at least partly housed in the receiving seat 3. More preferably, one or more inserted components 4 are mounted for rotation on the axis y-y passing through the two respective protruding portions 13.

Figure 15:
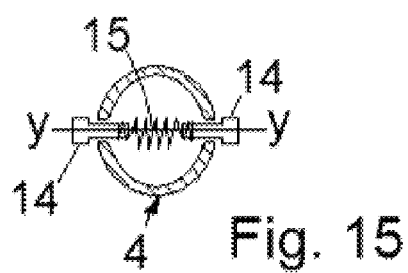

FIG. 15 shows an inserted component 4, for example hollow, which is provided with one or more opposite lugs 14 extending from the body of the inserted component and which can slide through suitable openings formed in the shell of the inserted component 4. The lugs 14 are elastically loaded by means of an elastic means, such as a helical spring 15 which can be located in the internal cavity of the inserted component 4.

Referring now to FIGS. 16 to 19, a support component 2 delimiting a plurality of receiving, preferably hollow seats or cavities 3 has been shown, in each seat extending from the support component 2, a protruding portion or lug, for example an inwardly extending lug 16, which is angularly displaceable between a raised trim or position with respect to the support component 2 (FIGS. 16 to 18), in which an inserted component 4, for example a bead or the like provided with an opening, for example through opening, is insertable on the protruding portion 16, and a lowered work trim or position (FIG. 19), in which the protruding portion 16 is bent or angularly displaced with respect to the raised position and borne to be, for example, coplanar with the support component 2, if this component is flat, or anyway housed in the cavity 3, thereby firmly anchoring the inserted component 4 inside the respective seat or cavity 3 or, in any case, determining a stable positioning of the inserted component 4 inside the respective seat or cavity 3 (FIG. 17). When the inserted component 4 has been seated in the respective cavity 3, it is mounted for rotation about the respective protruding portion 16.

The protruding portions 16 can be, for example, obtained by shearing the support component 2, in such a way that the support component delimits one or more cavities 3 each having a protruding portion 16 extending therein.

After an inserted component 4 (for example a bead or the like) has been strung or inserted on a protruding portion 16 and after that the protruding portion 16 has been displaced owing to a deformation or to an angular displacement about an articulation axis, manually controlled or controlled by means of a suitable automatic equipment, from the insertion raised position of the inserted component 4 (FIGS. 16 to 18) to the lowered work position (FIG. 19), the inserted component 4 is anchored in position inside the respective cavity 3. The inserted component 4 is kept free to rotate on the support component about the protruding portion 16. Optionally, after the protruding portion 16 together with the inserted component 4 strung thereon has been displaced from the raised to the lowered position, the tip or free end of the protruding portion 16 can also be fixed, e.g. welded to the support component 2.

FIGS. 20, 21 and 22 show a variant with respect to that above described, in which a weakening zone 16 of the anchoring base of each protruding portion 16 is provided, i.e. at the anchoring zone of the protruding portion to the support component 2, thereby facilitating the bending or deformation steps of the protruding portion or lug 16 during the mounting of the respective manufactured article, i.e. of the inserted component 4 on the support component 2.

It is also possible to pivot the protruding portion/s 16 to the support component 2, for example by means of an articulation pin 17, see FIGS. 23, 24 and 25, the articulation pin 17 being insertable at a base portion of the lug 16 and in the support component 2.

The protruding portion 16 can then comprise a suitably shaped tip 16b, in such a way as to snap insert or snap engage, when the protruding portion 16 is displaced in the lowered position or trim, a respective wall 18 delimiting the receiving seat or cavity 3. To this regard, the tip 16b can be for example concave or convex, whereas the wall 18 is convex or concave, respectively. Owing to such a provision, it is possible to obtain a firm engage in position of the protruding portion 16 in the respective cavity 3, when the protruding portion 16 is displaced in the lowered or work position, and a simple and rapid replacement of an inserted component 4, e.g. when it is worn or when one desires to replace it with another inserted component 4.

As it will be understood, a manufactured article 1 according to the present invention can include support component 2 and inserted component 4 having different shapes, such as to obtain different aesthetic effects.

As will be ascertained, none of the cited prior art documents teaches a manufactured article, such as a jewel or the like in which one or more inserted components seated in a respective receiving seat and mounted for rotation about the longitudinal axis of a respective portion projecting. This feature makes it possible to obtain a manufactured article provided with an inserted component that can be rotated in such a way as to bring different portions in view or externally to a respective receiving seat. Thus, in such a jewel or manufactured article, an user can, if desired, rotate one or more inserted components by stroking or anyway passing a hand over the outer surface/s of the jewel. Thanks to this expedient, since touching or skimming the manufactured article one or more inserted components can be caused to rotate, a manufactured article according to the present invention is pleasant and entertaining when touched.

Moreover, a manufactured article according to the present invention can have variable outer appearance, since if it includes inserted components with parts, for example, having different opacity, shape or color, one can bring first in view or outside parts with a specific opacity, shape or color and subsequently, by rotating the inserted component/s about the respective axis of rotation, parts with different opacity, shape or color.

Moreover, if a manufactured article according to the present invention has one or more through receiving seats, as it will be understood, it is much more simple mounting a respective inserted component, which can be inserted or extracted both from one side of a respective receiving seat and from the other. Furthermore, where it is foreseen a manufactured article with inserted component seated in a through receiving seat, which inserted component is visible or can be engaged by both sides or openings of the respective receiving seat, as a matter of fact, it is obtained a double face manufactured article having inserted components in view from both sides. Such a manufactured article is also very light, since the support component can also comprise a thin foil or plate having through housing seats for the inserted components.

The above-described manufactured article and the method are susceptible to numerous modifications and variants within the protective scope defined by the claims.

What is claimed is:
1. A method of obtaining a manufactured article, said manufactured article comprising at least one support component delimiting therein at least one receiving seat, at least one inserted component designed to be seated for rotation in a respective receiving seat in the support component, and binding means for binding said at least one inserted component to a respective receiving seat; the method, comprising the following steps of:
providing the components of said manufactured article,
constraining said inserted component to said support component,
wherein said binding means is an engagement element,
wherein said inserted component is constrained to said support component by inserting said engagement element into said inserted component and fixing said engagement element to said support component,
wherein before the step of constraining said inserted component to said support component the following steps are carried out:
providing a base or mask component delimiting one or a plurality of slots having distribution and size substantially corresponding to said at least one receiving seat delimited by said support component;
locating said inserted component in a respective slot of said base component; and
approaching the support component and the base component in such a way as to bring them in mutual abutment, and insert said at least one inserted component into said at least one respective receiving seat in said support component.

2. A method as claimed in claim 1, wherein said inserted component is hollow.

3. A method as claimed in claim 1, wherein said base component has protruding or recessing parts shaped in such a way as to engage with respective recessing or protruding portions of said support component, thereby ensuring correct positioning of said support component on the base component and alignment of seats and slots.

4. A method as claimed in claim 1, wherein said engaging element is at least one inwardly extending lug, wherein said inserted component is constrained to said support component through a deformation of said support component or of said inserted component, after said inserted component has been positioned in its respective seat, thereby causing the insertion of said at least one inwardly extending lug in a respective portion of said inserted component.

5. A method as claimed in claim 1, wherein said engaging element is a lug, wherein said inserted component is constrained to said support component by inserting said inserted component on said lug and subsequently displacing said lug from a raised to a lowered position.

6. A method as claimed in claim 1, wherein said support component is substantially cap-shaped delimiting an inner space or chamber, and in that said inserted component is inserted in its respective seat from outside of said support component or from inside thereof, i.e. from said chamber.

* * * * *